United States Patent [19]

Hebert et al.

[11] Patent Number: 5,039,115

[45] Date of Patent: Aug. 13, 1991

[54] SEAL FOR A ROTATING SHAFT

[75] Inventors: Michel J. H. Hebert, Brunoy; Laurent Gille, Melun, both of France

[73] Assignee: Societe Nationale d'Etude de et Construction de Moteurs D'Aviation, Paris, France

[21] Appl. No.: 490,306

[22] Filed: Mar. 8, 1990

[30] Foreign Application Priority Data

Mar. 8, 1989 [FR] France .................. 89 03019

[51] Int. Cl.$^5$ ............................... F16J 9/24
[52] U.S. Cl. .................. 277/136; 277/142; 277/175; 277/192
[58] Field of Search ............ 277/136, 137, 142, 192, 277/195, 175, 53, 45, 46, 50, 81 S, 83, 47

[56] References Cited

U.S. PATENT DOCUMENTS

| 983,201 | 1/1911 | Brussard | 277/44 |
|---|---|---|---|
| 1,891,436 | 12/1932 | Michell | 277/137 |
| 2,222,360 | 11/1940 | Brown | 277/137 |
| 2,867,458 | 1/1959 | Kroekel | 277/142 |
| 2,908,516 | 10/1915 | Stein | 277/137 |
| 3,081,097 | 3/1963 | Dison et al. | |
| 3,405,948 | 10/1968 | Junker | 277/137 |
| 3,575,424 | 4/1971 | Taschenberg | |
| 3,912,342 | 10/1975 | Schirm et al. | |
| 4,175,755 | 11/1979 | Geary | 277/137 |
| 4,266,788 | 5/1981 | Ludwig | 277/153 |
| 4,304,408 | 12/1981 | Greenawalt | 277/94 |
| 4,384,727 | 5/1983 | Junker | 277/137 |
| 4,408,765 | 10/1983 | Adelmann, Jr. | |
| 4,943,069 | 7/1990 | Jinnouchi | 277/195 |

FOREIGN PATENT DOCUMENTS

| 0100804 | 6/1984 | European Pat. Off. |
| 602709 | 3/1926 | France |
| 2120656 | 8/1972 | France |

Primary Examiner—William A. Cuchlinski, Jr.
Assistant Examiner—Daniel G. DePumpo
Attorney, Agent, or Firm—Bacon & Thomas

[57] ABSTRACT

A seal for a rotating shaft is disclosed which seals the shaft as it passes through a stationary partition wall. The seal has a segmented graphite sealing ring extending around the shaft located in an annular recess of a casing attached to the partition wall. A retaining ring having axial projections extending into radial grooves defined by the sealing ring is attached to the casing and a retaining washer extends circumferentially between the graphite segments and the retaining ring to prevent any relative axial movement between the elements. Relative rotation and axial movement between the retaining ring and the casing is prevented by stop pegs and a stop ring.

7 Claims, 2 Drawing Sheets

SEAL FOR A ROTATING SHAFT

BACKGROUND OF THE INVENTION

The present invention relates to a seal for a rotating shaft, more specifically an integrated seal for a gas turbine engine shaft.

Frequently in gas turbine engines, it is necessary to pass a rotating shaft through a stationary partition wall forming part of an enclosure, one of which contains air and oil on one side of the partition and the other of which holds air on the opposite side of the partition which must be kept free of oil. It has proven difficult to provide a seal around the shaft passing through the partition which will effectively prevent the intermixing of the elements on opposite sides of the partition wall.

European patent application 0 110 804 discloses a rotating seal arrangement wherein a circular shaped seal element is fixedly secured to a rotating shaft and is used in combination with a valve element to prevent the escape of oil from the lubricated seal.

French Patent 2,120,656 discloses, in FIG. 2, a carbon ring held around a shaft by means of a circumferential spring extending around the carbon ring. The ring is placed within a cage wherein it is positioned relative to a retaining ring by a spring means.

Other solutions to this problem have involved the mounting of a case with a de-oiling coil near where the shaft passes through the partition. These solutions may or may not include a segmented ring which is directly mounted and preassembled on the case. While these solutions had made the implementation easier, they entail the drawback of increased weight and higher costs.

SUMMARY OF THE INVENTION

A seal for a rotating shaft is disclosed which seals the shaft as it passes through a stationary partition wall to prevent oil from contaminating the elements on either side of the partition wall. The seal has casing attached to the partition wall which extends around the shaft and defines an annular recess. A de-oiling coil extends from the casing and surrounds the outer surface of the rotating shaft.

A segmented graphite sealing ring extends around the shaft and is located in the annular recess of the casing. Each of the graphite segments defines a circumferential groove and a radial groove.

A retaining ring having axial projections extending into each of the radial grooves is attached to the casing and a retaining washer extends circumferentially between the graphite segments and the retaining ring to prevent any relative axial movement between these elements. Springs are interposed between the retaining ring and the graphite segments to urge a surface of each of the graphite segments into contact with a surface of the casing.

Relative rotation between the retaining ring and the casing is prevented by stop pegs extending from the casing and engaging grooves formed in the retaining ring. A stop ring disposed in a circumferential groove in the casing and contacting a portion of the retaining ring prevents relative axial movement.

The seal according to the present invention averts the various drawbacks of the known seals, while at the same time assure the impermeability of the partition crossed by the shaft, one of which may hold air while the other holds oil.

DETAILED DESCRIPTION OF THE PREFERRED EMBODIMENT

Figure 1:
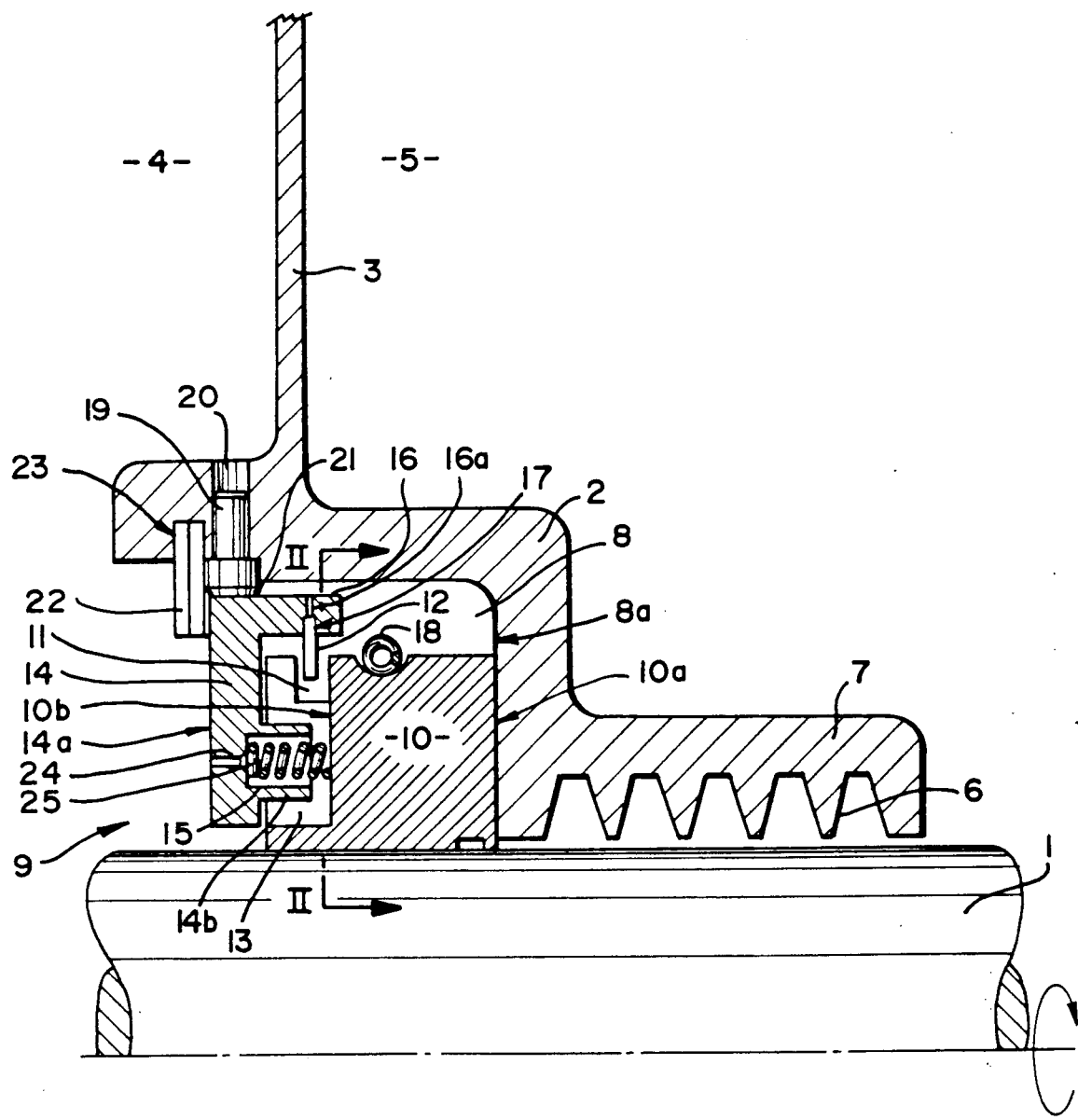
FIG. 1 is a partial, cross-sectional view of a seal according to the present invention.
Figure 2:
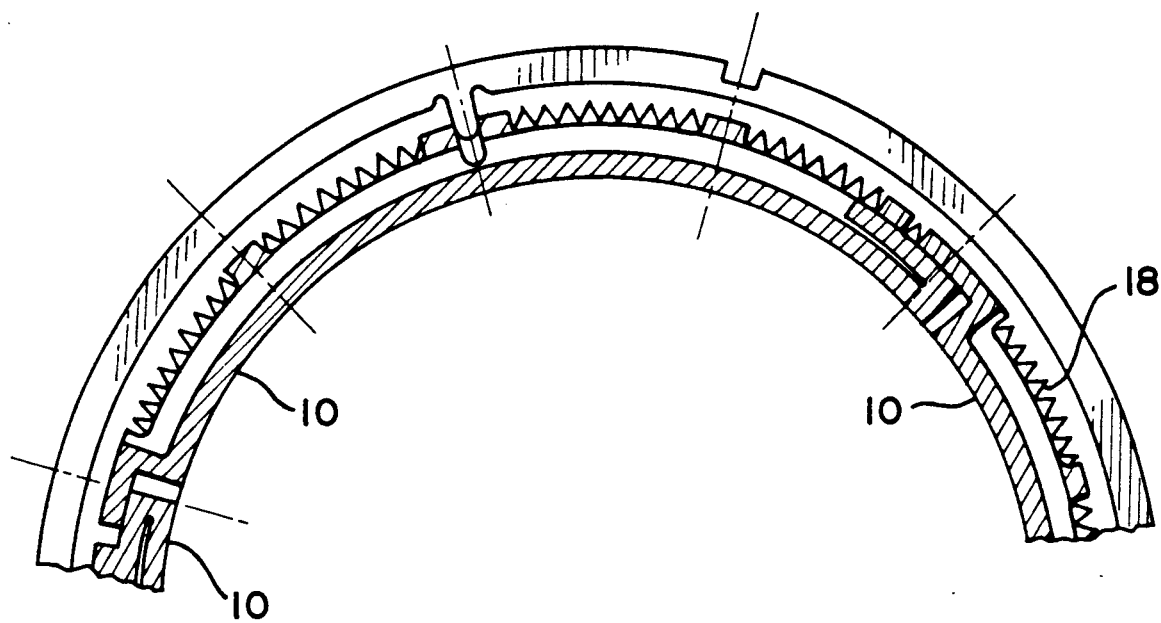
FIG. 2 is a partial view taken along line II—II in FIG. 1.
Figure 3:
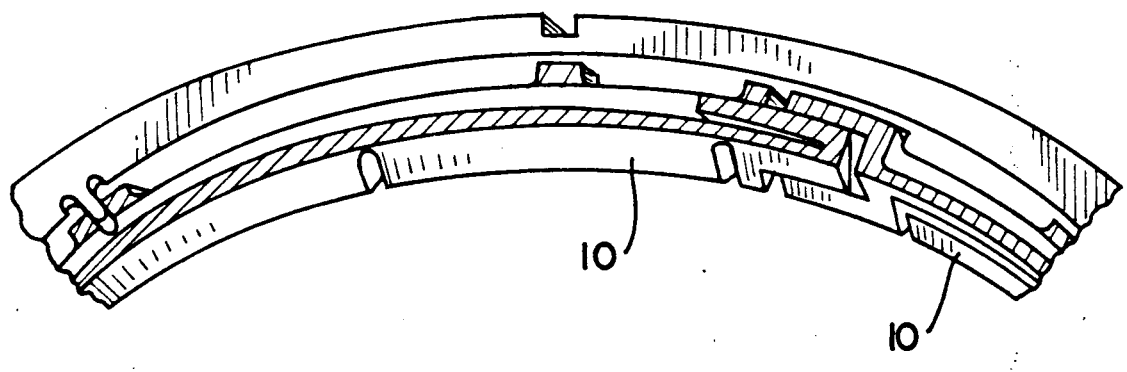
FIG. 3 is a partial perspective view of the sealing ring according to the present invention.

As illustrated in the FIGURE, a shaft 1 is rotationally supported by a sealing bearing such that it may rotate with respect to stationary partition wall 3. Partition wall 3 separates two adjacent enclosures, an air enclosure 4 on one side of the partition wall 3 and an oil enclosure 5 on an opposite side of the partition wall 3. A casing 2 is attached to the partition wall 3 and extends around the rotating shaft 1. A collar 7 extends axially from the casing 2 and defines a de-oiling coil 6 adjacent to the surface of the rotating shaft 1.

The casing 2 defines a generally annular recess 8 adapted to receive a seal, generally indicated at 9.

The seal 9 comprises a sealing ring 10 extending circumferentially around the rotating shaft and comprising a plurality of graphite ring segments. A first side 10a of each of the graphite sealing ring 10 bears against side 8a of the casing 2 which defines a portion of the annular recess 8 while a second side slidingly contacts the surface of the shaft. Each of the graphite ring segments define a circumferentially extending groove 11 which is adapted to receive a resilient retaining washer 12. The retaining washer 12 extends through all of the segments to connect them together to form the sealing ring. Side 10b of the sealing ring 10, located opposite of the aforementioned side 10a defines at least one generally radially extending groove 13.

Retaining ring 14 is located on the side of the sealing ring opposite the side 10a and has a plurality of axial projections 14b located such that each projection extends into one of the radially extending grooves 13 on each of the ring segments. Springs 15 are located in the axial projections 14b and bear against side 10b of the sealing ring and the retaining ring 14.

Retaining ring 14 also has a generally axially extending arm portion 16 that defines an inwardly opening, circumferential groove 17. Groove 17 is adapted to accommodate a portion of the retaining washer 12 so as to prevent any relative axial movement between the retaining ring 14 and the sealing ring 10.

A circumferential spring 18 extends around the outer periphery of the sealing ring segments thereby urging them into contact with the rotating shaft 1 and to increase the rigidity of the sealing ring.

Locking means are operatively interposed between the retaining ring 14 and the casing 2 in order to prevent any relative rotation and any relative axial movement between these elements. The anti-rotation locking means may comprise a stop peg 19 having a portion extending into opening 20 formed in the casing 2 and a portion extending into a generally axially extending groove 21 formed in the outer surface of the retaining ring 14. The contact between the anti-rotational peg 19 and the groove 21 prevents any relative rotation between the locking ring 14 and the casing 2.

A stop ring 22 extending from circumferential groove 23 formed in casing 2 bears against a surface of the retaining ring 14 to prevent any axial movement between the retaining ring and the casing. In order to facilitate the disassembly of the seal structure, side 14a of the retaining ring 14 defines a hole 24 to receive rivet 25 which holds the spring 15 within the axial projection 14b such that it bears against side 10b of the sealing ring 10.

The seal assembly according to the invention may be assembled by the following steps:

a) the retaining ring 14 is interfitted with the graphite ring segments held together via circumferential spring 18 such that the projections 14b enter the grooves 13 and spring 15 bears against surface 10b;

b) the resilient retaining washer 12 is radially compressed such that it may be moved into alignment with the groove 17 formed in the retaining ring 14 and subsequently expanded to hold these elements together;

c) stop peg 19 is placed in hole 20 on casing 2 and the assembly of the retaining ring and the sealing ring segments is placed into the annular recess 8 such that a portion of the stop peg engages the groove 21 on the retaining ring; and d) the stop ring 22 is resiliently compressed such that it may enter the groove 23 in the casing and bear against the surface 14a of the retaining ring 14.

The disassembly of the seal structure is also easily carried out by compressing and withdrawing the stop ring 22 and withdrawing the entire seal assembly from the annular recess 8. Upon withdrawal, the elastic retaining washer 12 is radially compressed to be disengaged from the groove 17. This may be achieved by inserting a tool into small holes 16a defined in the axially extending portion 16 of the retaining ring 14 in alignment with the groove 17. This disconnects the retaining ring 14 from the graphite ring 10.

The foregoing is provided for illustrative purposes only and should not be construed as in any way limiting this invention, the scope of which is defined solely by the appended claims.

What is claimed is:

1. A seal for a rotating shaft passing through a stationary partition wall to prevent the intermixing of different elements located on opposite sides of the partition wall comprising;

a) a casing attached to the partition wall and extending around the shaft to define a generally annular recess;

b) an axial collar extending from the casing and defining a de-oiling coil adjacent to the shaft;

c) a plurality of sealing ring segments forming a sealing ring extending around the shaft, the sealing ring segments being located in the annular recess, each segment having a first surface in contact with the casing and a second surface in sliding contact with the shaft, the sealing ring segments defining a first circumferential notch and a generally radially extending notch;

d) a retaining ring having generally axially extending projections located so as to enter the generally radially extending notches to prevent relative circumferential movement between the retaining ring and the sealing ring segments, the retaining ring defining a second circumferential notch;

e) spring biasing means located in the axially extending projections and acting on the sealing ring segments to urge the first surface into contact with the casing;

f) a retaining washer engaging the first and second circumferential notches to hold the retaining ring and sealing ring segments assembled as a unit and to prevent relative axial movement between the retaining ring and the sealing ring segments; and, g) locking means operatively associated with the retaining ring and the casing to prevent relative axial movement and relative rotation between the retaining ring and the casing.

2. The seal according to claim 1 wherein the sealing ring segments are graphite.

3. The seal assembly to claim 1 wherein the locking means comprises:

a) a generally axially extending groove defined by the retaining ring;

b) a stop peg attached to the casing such that a portion of the stop peg engages the generally axially extending groove to prevent relative rotation between the retaining ring and the casing; and, c) a stop ring located in a third circumferential notch defined by the casing such that a portion of the stop ring contacts the retaining ring to prevent relative axial movement between the casing and the retaining ring.

4. The seal according to claim 3 wherein the stop ring is resiliently deformable.

5. The seal according to claim 1 further comprising a spring extending circumferentially around the seal ring.

6. The seal according to claim 1 wherein the retaining washer is resiliently deformable.

7. The seal according to claim 1 wherein the spring biasing means comprises a coil spring.

* * * * *